United States Patent [19]

Schulz

[11] 4,433,809
[45] Feb. 28, 1984

[54] CONTROLLER FOR AIR CONDITIONING OR HEATING SYSTEM

[76] Inventor: Daniel R. Schulz, 1009 Hollywood Ave., Clearwater, Fla. 33519

[21] Appl. No.: 301,882

[22] Filed: Sep. 11, 1981

Related U.S. Application Data

[63] Continuation-in-part of Ser. No. 129,690, Mar. 12, 1980, Pat. No. 4,288,990, said Ser. No. 129,690, is a continuation of Ser. No. 30,369, Apr. 16, 1979, abandoned.

[51] Int. Cl.³ .......................................... G05D 23/00
[52] U.S. Cl. .................................... 236/47; 165/11 R
[58] Field of Search ..................... 236/47; 165/11, 26, 165/27

[56] References Cited

U.S. PATENT DOCUMENTS

| | | | |
|---|---|---|---|
| 3,796,892 | 3/1974 | Stewart | 62/158 X |
| 4,038,061 | 7/1977 | Anderson et al. | 62/126 |
| 4,060,123 | 11/1977 | Hoffman et al. | 236/47 X |
| 4,294,404 | 10/1981 | Gajjar | 236/49 |

*Primary Examiner*—William E. Wayner
*Attorney, Agent, or Firm*—Frijouf, Rust & Pyle

[57] ABSTRACT

A control circuit is disclosed for controlling an air conditioning and/or heating system in a region comprising a first circuit for establishing electrical signals corresponding to an upper and lower temperature of a first temperature range. A second circuit is provided for establishing electrical signals corresponding to an upper and lower temperature of a second temperature range. A presence sensor is provided for detecting the presence of a person inhabitating the region. A logic circuit is connected to the aforementioned circuit for controlling the system in accordance with a first temperature range when a person is inhabiting the region and for controlling the system in accordance with the second temperature range when the region is void of inhabitation by a person.

20 Claims, 13 Drawing Figures

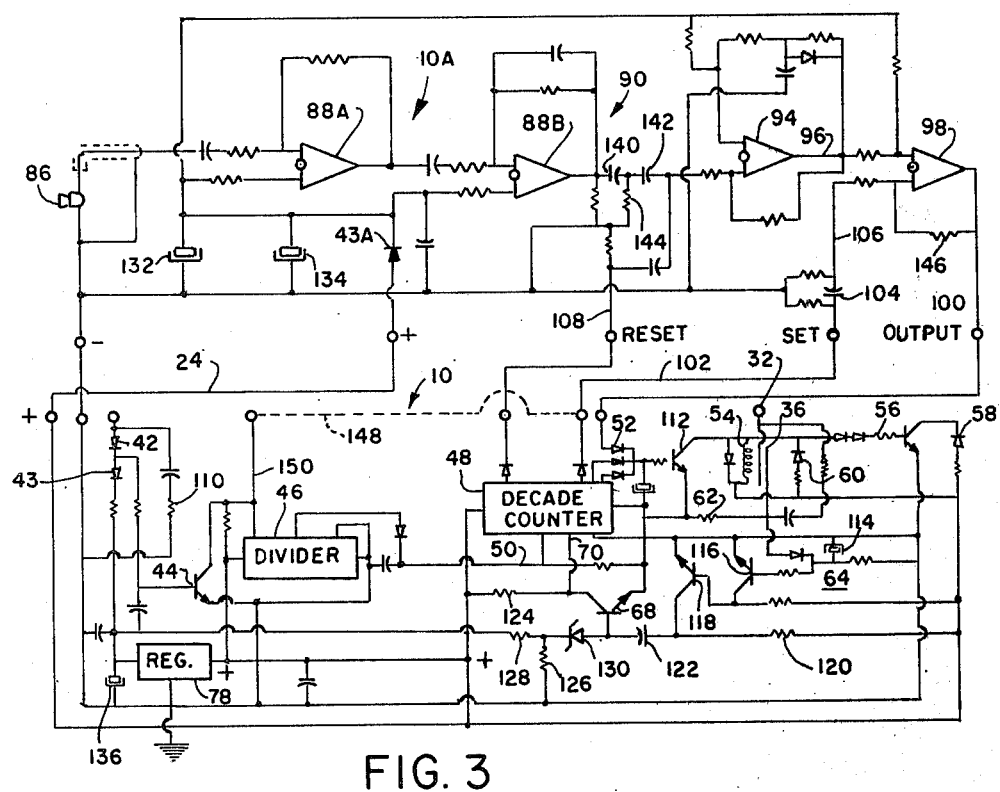
FIG. 3
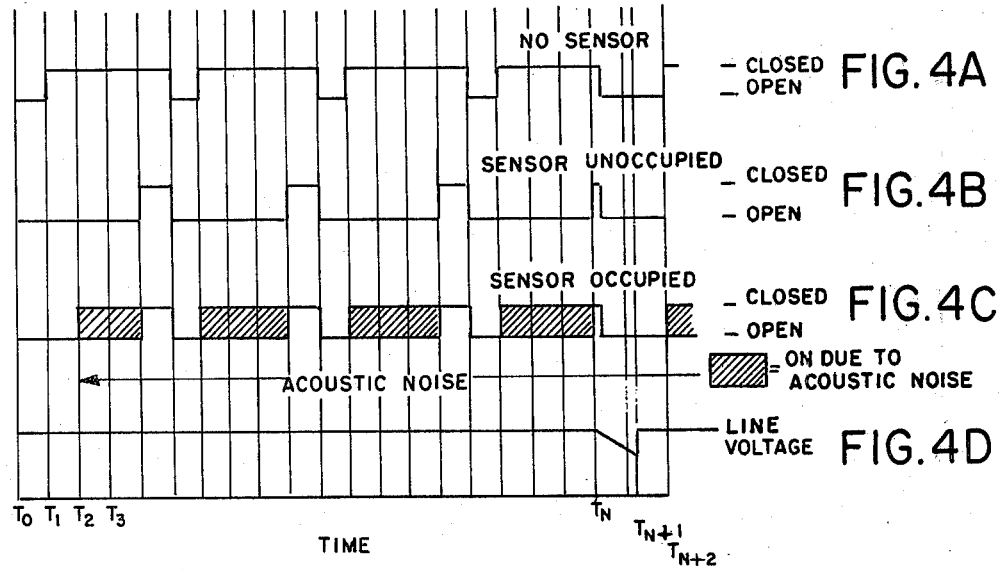

CONTROLLER FOR AIR CONDITIONING OR HEATING SYSTEM

CROSS REFERENCE TO RELATED APPLICATIONS

This application is a continuation-in-part of my prior patent application, Ser. No. 129,690 filed Mar. 12, 1980, now U.S. Pat. No. 4,288,990. Application Ser. No. 129,690 was a continuation of my prior application Ser. No. 30,369 filed Apr. 16, 1979, now abandoned. All prior patent applications are hereby incorporated by reference into the instant application.

BACKGROUND OF THE INVENTION

1. Field of the Invention

This invention relates to air conditioning and/or heating and more particularly to a control circuit for controlling an air conditioning or heating system.

2. Description of the Prior Art

Various types of apparati have been devised in the prior art in an attempt to deactivate a thermostat of an air conditioning or heating system for a period of time in order to reduce operational cost. Various types of mechanical timers have been incorporated to enable the thermostat to operate for a first period of time and to deactivate the thermostat for a second period of time. Electronic circuits have also been devised to accomplish the same or similar tasks. Unfortunately, these devices were not synchronized with the operation or status of the thermostat and accordingly the compressor could be subjected to rapid starting and stopping creating excessive pressures within the compressor. Many air conditioning experts hesitate to recommend mechanical cyclers due to the possibilities of the excessive pressures created within the compressor due to the rapid starting and stopping of the compressor.

In an attempt to overcome this hazard, others in the prior art have developed circuits which prohibit operation of the compressor for a given period of time after the compressor has terminated operation.

Others in the prior art have developed line voltage sensors for terminating operation of the compression upon a reduction of line voltage. Unfortunately, the aforementioned contributions of the prior art have never been consolidated into a single and inexpensive unit. Most of the prior art units were overly complex and unreliable and accordingly, did not find widespread use in the industry. Examples of prior art patents relating to the present invention include U.S. Pat. Nos. 3,625,020; 3,628,346; 3,636,369; 3,640,085; 3,673,811; 3,707,611; 3,721,866; 3,721,880; 3,777,240; 3,817,052; 3,864,611; 3,946,574; 4,028,593; 4,034,570; 4,045,973; 4,094,166; 4,102,389 and 4,128,854.

In my prior U.S. Pat. No. 4,288,990 issued Sept. 15, 1981, I disclosed a novel control unit incorporating a time cycler with interrelated safety features to protect the compressor from damage. In addition, my prior invention utilized a presence sensor for altering the time cycle in accordance with the occupancy of the air conditioned or heated region.

It is an object of the present invention to provide an improvement to my prior invention which results in a superior control circuit for many installations and is a further advancement to the air conditioning and heating art.

Another object of this invention is to provide an apparatus for controlling an air conditioning and/or heating system in accordance with time, activity and temperature.

Another object of this invention is to provide an apparatus for controlling an air conditioning and/or heating system for deactivating the compressor or heater when the source voltage is reduced below a preselected minimum power level.

Another object of this invention is to provide an apparatus for controlling an air conditioning and/or heating system for terminating operation of the compressor in the event of loss of one phase of a plural phase power source.

Another object of this invention is to provide an apparatus for controlling an air conditioning and/or heating system in accordance with the activity within the area being air conditioned or heated.

Another object of this invention is to provide an apparatus for controlling an air conditioning and/or heating system which is more sensitive and a more simplified circuit than my prior invention.

Another object of this invention is to provide an apparatus for controlling an air conditioning and/or heating system which establishes a first and a second preferred temperature range whereby the air conditioning and/or heating system is controlled within the first preferred temperatures range during occupancy of the air conditioned or heated region and is controlled within the second preferred temperature range during non-occupancy of the air conditioned or heated region.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention may be incorporated into an apparatus and method with the preferred form of the invention being shown in the accompanying drawings with the scope of the invention defined by the appended claims. For the purpose of summarizing the invention, the invention may be incorporated into a control for controlling air conditioning and/or heating system in a region comprising a first means for establishing electrical signals corresponding to an upper and lower temperature of a first temperature range. Second means is included for establishing electrical signals corresponding to an upper and lower temperature of a second temperature range. Third means is provided for sensing the presence of a person inhabiting the region. Fourth means, such as a logic circuit, is connected to the first, second and third means for controlling the system in accordance with the first temperature range when a person is inhabiting the region and for controlling the system in accordance with the second temperature range when the region is void of inhabitation by a person.

The circuit may have other novel features including a voltage sensing means for sensing a reduction below a preselected level of the line voltage powering the system. The voltage sensing means is connected to the logic circuit for terminating operation of the system for a preselected period of time. In addition, means may be provided for preventing operation of the system for a preselected period of time upon termination of operation of the system for any reason. In these embodiments, a divider and counting circuit provides a timing means which divides and counts the alternating current cycles of the line voltage powering the system. A decoder is connected to receive the output of the counter circuit for providing a preselected timed operation cycle output.

The third means may include an acoustic sensor such as an audible frequency microphone for sensing the acoustic output of movement within the region. A novel filter is interconnected with the acoustical sensor for discriminating acoustic output of activity within the region from acoustic output of activity outside of the region.

Preferably, the first temperature range is coextensive with a portion of the second temperature range whereby the fourth means is responsive only to the first means when the temperature in the region is within the first temperature range. The first means inhibits operation of the system when the temperature of the region is within the desired first temperature range. The second means inhibits operation of the system when the temperature in the region is within the second temperature range concurrent with the third means sensing the region to be void of a person therein.

The fourth means may enable operation of the system in accordance with a preselected operation cycle from the timing means when the temperature of the region is within the second temperature range concurrent with the third means sensing the presence of a person inhabiting the region. Additionally, the fourth means enables operation of the system in accordance with the preselected operation timed cycle when the temperature of the region is outside of the second temperature range. The preselected operating cycle may include either a periodic duty cycle or a continuous duty cycle, depending upon the particular application.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a schematic diagram of the controller and the presence sensor shown in FIGS. 1 and 2;

FIGS. 4 A, B, C and D illustrate various waveforms and duty cycles present in the controller shown in FIGS. 1-3;

Similar reference characters refer to similar parts throughout the several views of the drawings.

DETAILED DESCRIPTION

Figure 1:
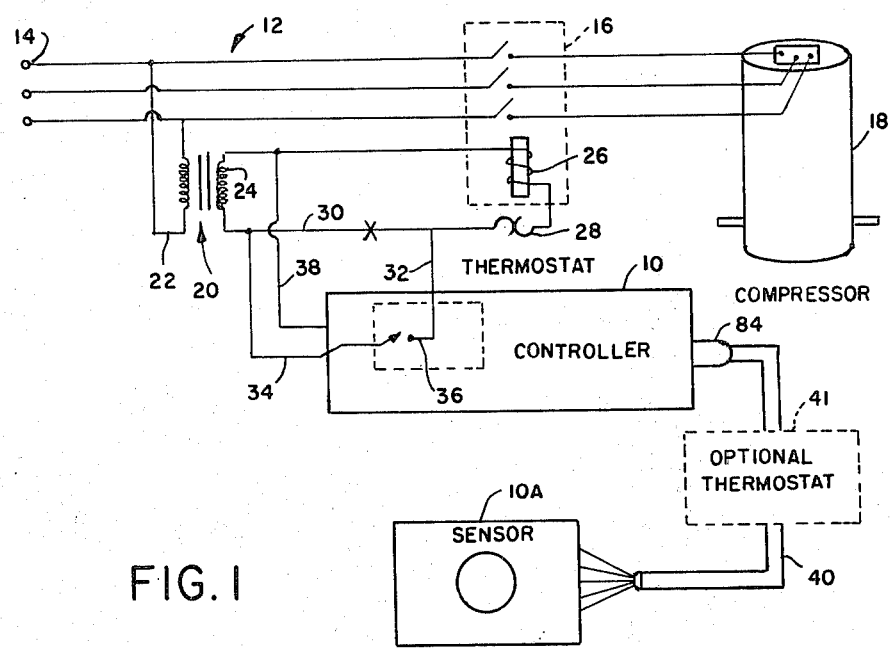
FIG. 1 is a block diagram of a first apparatus interconnected with a conventional air conditioning and/or heating system.
Figure 2:
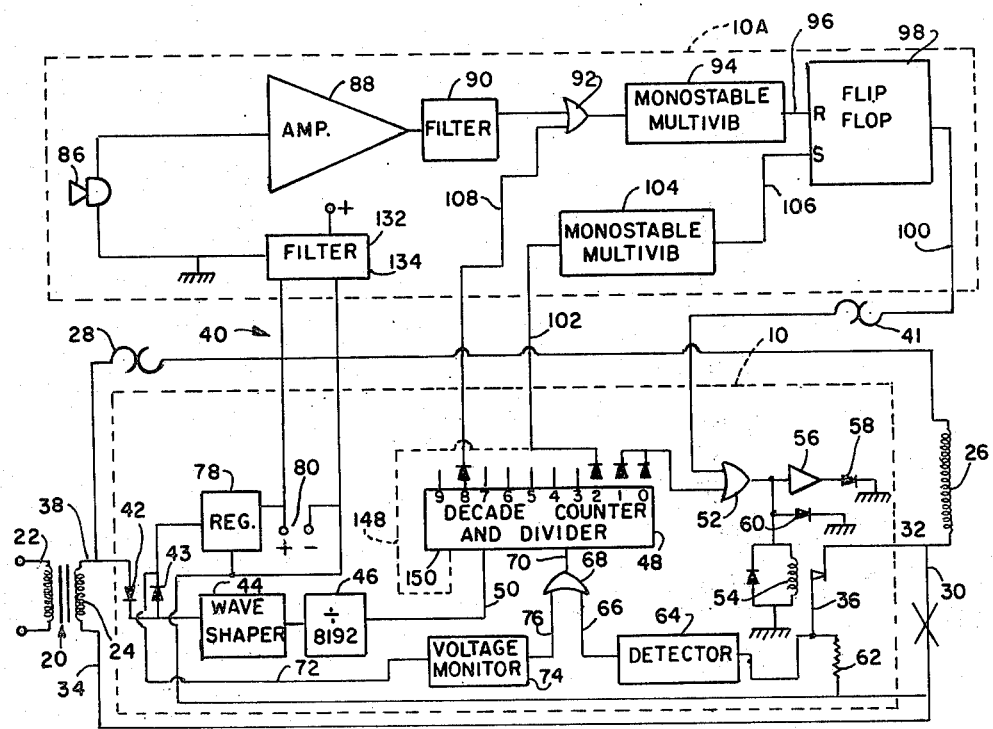
FIG. 2 is a circuit diagram of a controller and a presence sensor of the apparatus shown in FIG. 1.

FIG. 1 illustrates the apparatus 10 comprising a controller and sensor 10A shown more particularly in FIGS. 2 and 3 connected to a conventional air conditioning system 12. Although the system 12 is illustrated as an air conditioning system, it should be understood that the instant invention may be applied to an air conditioning and/or a heating system or a heat pump functioning as both an air conditioner and a heater. Such a modification is considered to be within the teachings of the instant invention.

The system comprises a power source 14 shown as a single phase 220 volt or three-phase power source connected through a relay 16 to the air conditioning compressor 18. A transformer 20 has a primary side 22 thereof connected between two terminals of the power source 14. The secondary 24 of transformer 20 is conventionally connected by class 2 wiring to a relay coil 26 through a thermostat 28. The thermostat 28 may comprise bimetal contacts wherein electrical conduction is provided through relay coil 26 to close relay 16 and provide power to compressor 18. The instant apparatus 10 may be conventionally installed by severing connector 30 as indicated by the x to provide a conduction path by connectors 32 and 34 through a controllable switch means 36. Operating power for controller 10 is provided by an additional connector 38 in cooperation with connector 34. The controller 10 is connected by a multiple cable 40 to sensor 10A. Accordingly, when controller 10 opens controllable switch means 36, thermostat 28 is deactivated, thereby preventing relay 16 from closing. The closing of controllable switch means 36 enables the activation of thermostat 28 which, in turn, may activate relay 16 upon closing the thermostat contacts. An optional thermostat 41 may be interposed in cable 40 as will be explained hereinafter.

FIG. 2 is a block diagram of the controller 10 and sensor 10A shown in FIG. 1. The controller 10 in the preferred form enables the thermostat 28 to close relay 16 for a reduced period of time, for example 80% of a normal operating cycle. The controller 10 prevents operation of thermostat 28 for 20% of the operating cycle resulting in up to a 20% savings in air conditioning cost. As can be seen by FIG. 1, the apparatus can be readily installed on existing air conditioning and/or heating systems such as window air conditioning units in motels, hotels and the like. The apparatus may also be incorporated within an air conditioning and/or heating system under present construction.

The secondary 24 of transformer 20 is rectified by diodes 42 and 43. The half-wave rectified waveform from diode 42 enters a wave shaper 44 to transform the rectified sine wave into a square pulse. The output of wave shaper 44 is applied to a divider 46 which divides the input pulse to produce one output pulse for every 8192 input pulses. Accordingly, 3,600 pulses per minute enter divider 46 providing one output approximately every two and one quarter minutes. The output of divider 46 is applied to a decade counter and divider 48 by a conductor 50. The decade counter and divider 48 is sensitized to only positive going input pulses resulting in a meaningful input pulse being applied to decade counter and divider 48 every two minutes and 15 seconds. Upon receiving an input pulse, the decade counter and divider 48 sequentially advances a high output from position 0 to position 9 as shown in FIG. 2. A high output in either position 0 or 1 is transferred by OR gate 52 to open the normally closed contacts of controllable switch 36 by conduction through coil 54. Opening of switch 36 inhibits operation of the thermostat to prevent operation of compressor 18. Concomitantly therewith, an output from OR gate 52 is transferred to an inverter 56 to power light emitting diode 58. In addition, the output of OR gate 52 is connected to a light emitting diode 60 for indicating that the controller 10 has deactivated the thermostat 28.

An output at position 2-9 of decade counter and divider 48 provides a signal to OR gate 52 thereby closing the normally closed contacts of controllable switch 36 enabling conduction through thermostat 28 and relay coil 26. A resistor 62, typically two ohms, is connected in series with controllable switch 36 to provide a one volt output when used with a standard thermostat system. The two ohm series resistance is insufficient to effect the operation of the thermostat 28 or relay 26 but will develop sufficient voltage to drive a detector 64 which monitors the voltage across resistor 62. Detector 64 is a monostable device, the output of which is connected by a conductor 66 through an OR gate 68 to a reset line 70 of the decade counter and divider 48. If the thermostat line is opened by either thermostat or controllable switch 36 this means that compressor 18 is not functioning and the one volt output will not be present across resistor 62. The lack of output across resistor 62 resets the decade counter and divider 48 to the zero position. The decade counter and divider 48 must sequence through the 0 and 1 position before relay coil 26 can reenergize the compressor 18 at the position 2. This arrangement eliminates the possibility of a short cycle damaging the compressor 18. In many of the prior art mechanical energy savers, the rapid termination and activation of a compressor can damage the expensive parts due to unequal pressure and the like within the air conditioning compressor. The aforementioned circuit insures that once the compressor has terminated operation for any reason, the compressor 18 cannot restart until the timing circuit has counted a sufficient number of pulses, preferably 4 minutes and 33 seconds, before restarting the compressor.

The output of diode 43 is applied by a connector 72 to a line voltage monitor 74. The line voltage monitor 74 provides an output on connector 76 to OR gate 68 when the line voltage drops below a preselected minimum standard. Preferably, the voltage monitor 74 provides an output to OR gate 68 when the line voltage drops below 85% of the desired line voltage of 24 volts on the secondary 24 of transformer 20. OR gate 68 will reset decade counter and divider 48 to the 0 position terminating operation of thermostat 28 and compressor 18 until the line voltage returns to the desired voltage level. The counter 48 will then begin counting and indexing to position 2, typically four and one half minutes before reactivating the thermostat 28. The output of diode 42 is isolated by diode 43 and drives a voltage regulator 78 to provide a low voltage power source 80 to operate the devices 10 and 10A.

The controller 10 provides three functions for the system shown in FIG. 1. First, the timer circuit deactivates the compressor for a first period of time, preferably two tenths of the total time, and enables activation of the compressor during the remaining second time period. Second, the controller 10 protects the compressor 18 against unequal pressures since the controller 10 prohibits operation of the compressor 18 for a period of four and one half minutes any time the compressor terminates operation for any reason. Third, the controller 10 deactivates the compressor 18 for a minimum period of four and one half minutes if the line voltage falls below a preselected desired value. The controller 10 provides distinct advantages over the prior art mechanical cyclers since a mechanical cycler cannot sense whether the compressor is in an active state. Accordingly, a mechanical cycler can restart a compressor in a 30 second period from the time operation of the compressor terminates. This time period is insufficient to enable equalization of gas pressure within the air conditioning compressor which may cause substantial damage to the unit. Many air conditioning experts are hesitant to recommend mechanical cyclers because of the damage caused by rapid cycling of compressors as a result of mechanical cyclers.

The sensor 10A is connected by multiple connector 40 and plug 84 in FIG. 1 to the controller 10. The occupancy sensor 10A further deactivates the compressor 18 during a period of inactivity within the room. The occupancy sensor 10A comprises an acoustical transducer such as a crystal microphone 86 connected to an amplifier 88, the output of which is applied to a filter network 90. The filter network 90 discriminates between acoustical output generated within the area being air conditioned and acoustical output generated outside the area being air conditioned. The filter network 90 will pass a signal with a high slew rate.

Noise external of a room being air conditioned is transferred by vibration of objects and the like. Accordingly, noise generated external to the room lacks the sharpness and rise time to pass through filter network 90. Signals passed by filter network 90 are applied through an OR gate 92 to a monostable multivibrator 94. The monostable multivibrator 94 generates a uniform output irrespective of the input thereto. The output of the monostable multivibrator 94 is applied by connector 96 to a set-reset flip flop 98. If the output from flip flop 98 on conductor 100 is low, the sensor 10A has no effect on the controller 10. If the output of flip flop 98 on conductor 100 is high, OR gate 52 energizes coil 54 to open switch 36 as heretofore described.

Assuming counter 48 begins indexing from position 0, upon indexing to position 2, a high output is passed by connector 102 to monostable multivibrator 104 to set flip flop 98 by line 106. This produces a high output on conductor 100 to inhibit closing of switch 36. If an acoustic output is sensed within the area being air conditioned, an output from filter 90 will reset flip flop 98 to provide a low output on conductor 100 to close switch 36. The sensor 10A will disable operation of the thermostat 28 during periods of inactivity within the area each time counter 48 produces an output at position 2.

In either event, the sequential outputs continue until a high output is produced in position 8. The high output is passed by a reset line 108 to OR gate 92 to reset flip flop 98 through reset line 96. The reset line 108 insures that irrespective of the activity within the room being air conditioned, the compressor 18 will be activated a portion of the time by virtue of the reset line 108. Accordingly, the combination controller 10 and sensor 10A provides a minimum of 20% to a maximum 80% compressor ON time and a minimum of 20% to a maximum of 80% compressor OFF time. The actual operation time of the compressor is determined by the activity within the room as sensed by the acoustical transducer 86. It should be understood that the foregoing relates to time in which the thermostat 28 can activate or close relay 16. It should be understood that if demand is not required as sensed by the thermostat 38, the thermostat 28 will not close relay 16 to energize the compressor 18. It should also be understood that the 80% and 20% times heretofore described are merely an illustration and any time relationship can be incorporated within this invention. The optional thermostat 41 shown in FIGS. 1 and 2 disables the sensor 10A if the temperature rises above some desired temperature level. The optional thermostat 41 insures that temperature control has priority over activity within the area after the temperature exceeds a desired level.

FIGS. 4A–4D illustrate some of the possible timing combinations generated by the circuit disclosed herein. The horizontal axis represents time with each division being equivalent to approximately four and one half minutes. FIG. 4A shows the position of switch 36 as a function of time for the controller 10 without sensor 10A. Switch 36 is open for the first four and one half minutes for the time required to count a sufficient number of pulses to index decade counter and divider 48 to position 2. The controller 10 then cycles the switch 36 to close the switch 80% of the time while opening the switch 36 the remaining 20% of the time. FIG. 4D shows a drop in the AC line voltage at $T_n$ with a return to normal voltage at $T_n+1$. The line voltage detector 74 in combination with OR gate 68 and line 70 resets decade counter and divider 48 and continues to maintain the compressor in the deactivated state until $T_n+2$ even though the voltage returned to normal at $T_n+1$.

FIG. 4B illustrates the position of switch 36 for the controller 10 and sensor 10A in an unoccupied room. In this embodiment the lack of acoustical output by filter network 90 reduces the activation time of thermostat 28. The only activation provided is due to reset line 108 which closes switch 36 approximately 20% of the time. In a similar manner, the reduction of line voltage approximately at $T_n$ opens switch 36 as heretofore set forth.

FIG. 4C illustrates the condition of switch 36 for the controller 10 and sensor 10A in an occupied room. The cycler begins in a similar manner to FIG. 4B with an occupant entering the room at $T_2$. The shaded areas indicate the period of on time due to an acoustical disturbance being detected by the acoustical transducer 86. Accordingly, the controller 10 closes switch 36 80% of the time and opens switch 36 20% of the time. The operation of the circuit during the low line voltage is similar to that shown in FIG. 4A.

FIG. 3 is a detailed schematic view of the block diagram shown in FIGS. 1 and 2. The basic operation of the circuit has been described with reference to FIG. 2 and only further details will be described with reference to FIG. 3. A resistor-capacitor combination 110 suppresses the input to protect the transistors and integrated circuits contained within the circuit. The output of first diode 42 is applied to a transistor 44 which comprises the waveshaper shown in FIG. 2. The output of transistor 44 is applied to the divider 46 which is connected to the decade counter and divider 48. The output of the decade counter and divider 48 is applied by a plurality of diodes functioning as OR gate 52 to a transistor 112 to drive the relay switch 36 and the light emitting diodes 58 and 60. The potential developed across resistor 62 is stored in a capacitor 114 to provide a voltage for operating transistor 116 to keep a second transistor 118 in a non-conducting state. The full supply voltage is developed across transistor 118 when a charge is present in capacitor 114. The current across resistor 120 is essentially zero due to the non-conducting state of transistor 118. Upon loss of charge on capacitor 114, transistor 116 wil cease to conduct and transistor 118 will conduct causing the voltage on the collector of transistor 118 to change from a high state to a low state. Capacitor 122 interconnects transistor 118 to transistor 68 to reset line 70. Upon conduction of transistor 118, transistor 68 is momentarily non-conducting, enabling resistor 124 to reset decade counter 48 on line 70.

Resistor 124 is connected to reset line 70 with the other end thereof being connected to a positive terminal of the power supply. Resistors 126 and 128 form a voltage divider between the unregulated portion of the power supply with a Zener diode 130 connecting the divided voltage to the base of transistor 68. When the line voltage falls below the Zener diode breakdown voltage, the base current of transistor 68 is terminated, thereby providing a high output on reset line 70 to the decade counter 48 to reset the counter upon a reduction of line voltage.

The sensor circuit 10A shown in FIG. 3 comprises a separate power supply filter section comprising filter capacitors 132 and 134 which are isolated from the regulator 78 and filter capacitor 136 by the second diode 43A. Filter capacitor 136 is small to discharge quickly during a loss of voltage reduction in the line voltage. This enables the circuit to immediately detect a reduction in line voltage. The larger capacity of capacitors 132 and 134 is required to operate the sensor circuit 10A. The amplifier 88 shown in FIG. 3 comprises a first amplifier 88A coupled to a second amplifier 88B to provide a gain of approximately ten thousand. The output of amplifier 88B is applied to the filter network 90 comprising capacitors 140 and 142 and resistor 144. Capacitor 142 is larger in capacity than capacitor 140. A rapid rise time signal will be passed by both the capacitors 140 and 142 whereas a slow rise time signal will be dissipated by resistor 144. The monostable multivibrator 94 is shown in this embodiment to be an amplifier with a capacitor resistor feedback network to provide an output to amplifier 98 which is configured into a set and reset flip flop. When the output of amplifier 98 is low, the non-inverting input is held through resistor 146 in a lower state than the state of the inverting input.

When the non-inverting input goes high, the output goes high, which is applied through resistor 146 back to the non-inverting input to provide a set and reset flip flop function.

An optional line 148 in FIG. 2 may be connected to output 2 of counter 48 to be connected to the clock enable or clock inhibit input 150. The incorporation of this line insures switch 36 is open at all times irrespective of time as long as there is no output from flip flop 98 on line 100. Accordingly, during inactivity in the room, the cycling feature of 20% compressor ON time is terminated and switch 36 will remain open until activity is detected by acoustical transducer 86. This feature, which may be optionally included in the circuit shown in FIG. 2, provides an additional energy savings as should be apparent to those skilled in the art.

The controller shown in FIGS. 1-4 provided a substantial contribution to the art by providing a timed compressor cycle which is dependent upon the activity within the air conditioned and/or heated region as detected by an occupancy sensor 10A. This circuit has been installed and tested and has provided remarkable energy savings for air conditioning and/or heating systems.

One disadvantage of this system was the fact that the system was only sensitive to time and activity within the region to be air conditioned and/or heated. This system completely ignored the temperature of the region other than through thermostats 28 and 41. A second disadvantage of this sytem was the minimum 20% OFF time of the compressor. This OFF time was objectionable in some installations. For example, assuming a room was unoccupied and the air conditioning compresor was only allowed to run 20 percent of the time, the temperature within the room, without the optional thermostat 41, could reach an uncomfortable level. Upon entry into the room by an occupant, the compressor would be immediately activated, but would continue only for 80% of the time. This 20% OFF time was objectional to the room occupant in some instances when the room had not achieved a desired temperature.

The circuit shown in FIGS. 5-10 overcomes the disadvantages of the circuit shown in FIGS. 1-4 and provides a sensor and control unit which provides a first temperature range which is suitable for occupancy and a second temperature range which is suitable during non-occupancy. The controller and presence sensor switches the temperature control between the first and second temperature ranges depending upon the occupancy within the region to be air conditioned and/or heated.

Figure 5:
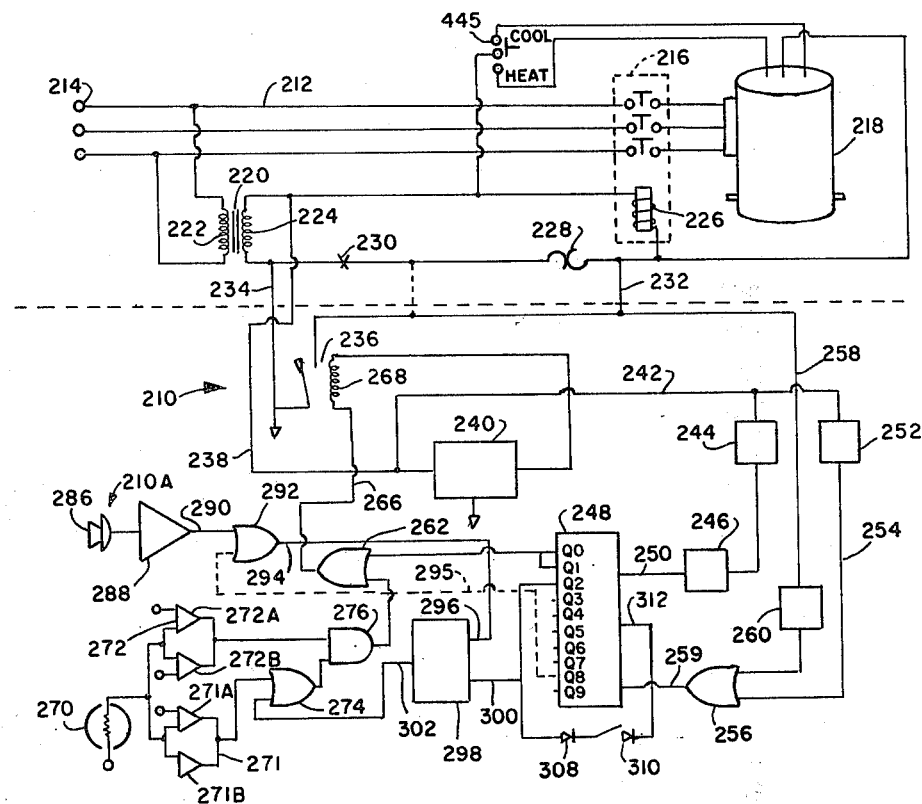
FIG. 5 is a block diagram of a second apparatus interconnected with a conventional air conditioning and/or heating system.

FIG. 5 illustrates an apparatus comprising a controller 210 and a presence sensor 210A connected to a conventional air conditioning and/or heating system 212. The air conditioning or heating system is similar to FIG. 1, and comprises a power source 214 shown as a single phase 220 volt or three phase power source connected through a relay 216 to and air conditioner compressor 218. Transformer 220 has a primary side 222 connected between two terminals of the power source 214. The secondary winding 224 of the transformer 220 is conventionally connected by Class two wiring to a relay coil 226 through a thermostat 228. The instant apparatus 210 may be conveniently installed by severing connector 230 and adding connector 232 to provide a conduction path by connectors 232 and 234 through a controllable switch means 236. Operating power for the controller 210 is provided by an additional connector 238 in cooperation with connector 234. Accordingly, when controller 210 opens controllable switch 236, the relay coil 226 is deactivated thereby preventing relay 216 from closing. The closing of controllable switch means 236 enables current flow through coil 226 to activate relay 216 for energizing the compressor 218. The present circuit 210 may operate without the conventional thermostat 228.

The connector 238 is applied to power supply 240 which may be a conventional power supply to provide DC power for the control circuit. The connector 238 is also applied by connector 242 to a waveshaper 244 for providing a suitable waveform to divider 246. Divider 246 preferably provides an output for every 8,192 input pulses from the line voltage. The output of divider 246 is applied to a clock input of a decade counter and divider or decimal decoder 248 by line 250. The voltage on connector 242 is also applied to a low voltage detector 252 with the output thereof applied by connector 254 to OR gate 256. A connector 258 from switch 236 is applied to an anti-short cycle circuit 260, the output thereof being applied to OR gate 256. The output of OR gates 256 is applied to a reset input 259 of the decimal decoder 248.

The decimal decoder 258 will sequence a high output from Q0 to Q9 upon an input from the divider 246. An output from OR gate 256 will reset decimal decoder 248 to begin providing a high signal at the Q0 output. An output at the Q0 or Q1 position from decimal decoder 248 provides a high input to OR gate 262 to produce a high output on connector 266 thus preventing current flow through relay coil 268 to open switch 236 and prevent operation of the compressor 218. Accordingly, for outputs Q0 and Q1 of the decimal decoder 248, the compressor 218 is inhibited from operation. A temperature sensor 270, shown as a thermistor, is applied to a first and a second circuit 271 and 272 comprising differential amplifiers 271A and 271B and differential amplifiers 272A and 272B. The amplifiers 217A and 271B provide an upper and a lower voltage corresponding to a desired upper and lower temperature of a first desired temperature range T1. The amplifiers 272A and 272B provide an upper and lower voltage corresponding to a desired upper and lower temperature of a second desired temperature range T2. The first temperature range T1 is selected to be desirable for use when the region is inhabitated by a person, preferably 70-75 degrees, whereas the second temperature range T2 is selected to be desirable when the region is not inhabited by a person, typically 65-82 degrees.

The output from the first set of amplifiers 271A and 271B is applied to an OR gate 274 whereas the output of the second set of amplifiers 272A and 272B is applied to AND gate 276. The output of AND gate 276 is connected to an input of OR gate 262.

The presence sensor 210A is shown comprising an acoustical transducer 286 such as a crystal microphone connected to an amplifier and associated filters 288. The output of amplifier 288 is applied by connector 290 to an OR gate 292. The output 294 of OR gate 292 is applied to a reset input 296 of a set-reset flip flop 298. The set input 300 of the set-reset flip flop 298 is connected to output Q2 of the decimal decoder 248. An output 302 of the set-reset flip flop 298 is connected to an input of OR gate 274. The number Q8 output of the decoder 248 may optionally be connected by line 295 to OR gate 292. The number Q2 output of the decade counter and divider 248 is also connected through a diode 308 and switch 310 to a clock enable or clock inhibit input 312.

Figures 6, 7:
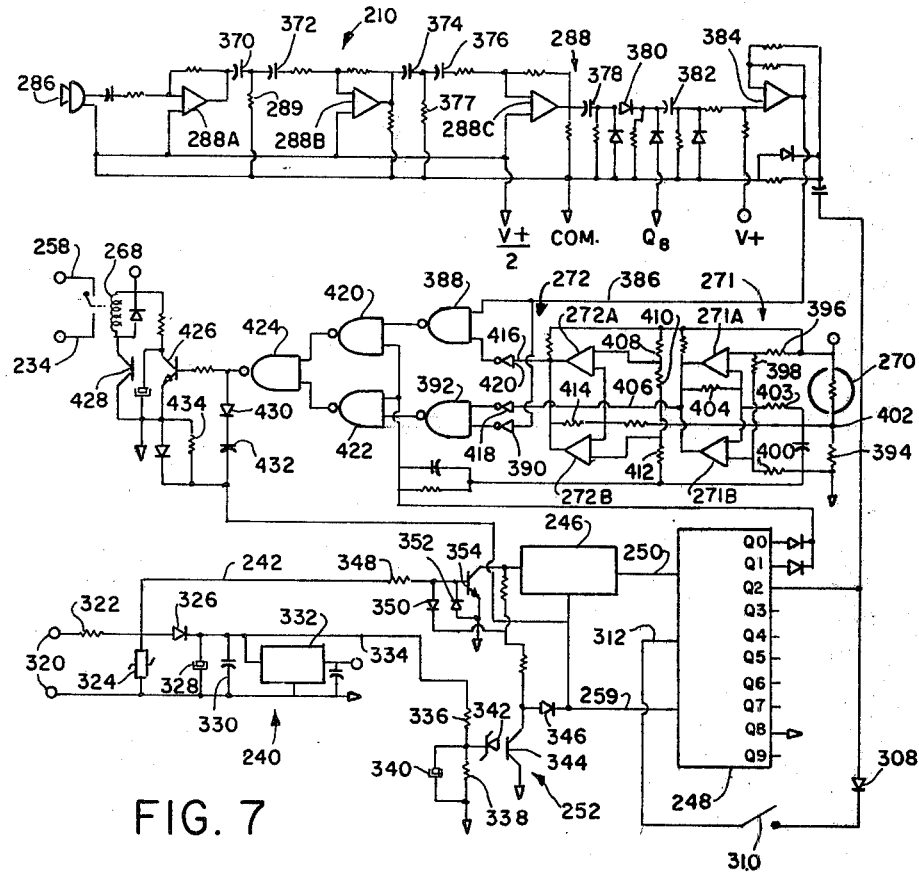
FIG. 6 is a table showing the operation of the controller in FIG. 5 under various conditions.
FIG. 7 is a schematic diagram of the controller and presence sensor of FIG. 5.

The operation of the system shown in FIG. 5 can best be understood with reference to the Table shown in FIG. 6. System 1 refers to the operation of the circuit shown in FIG. 5 with switch 310 in the open position whereas System 2 refers to the operation of the circuit with switch 310 in the closed position. The first range in temperature T1 is shown by the arrows 314 to contain the temperatures between 70 and 75 degrees which is the desired temperature when a person is present within the region to be air conditioned or heated. The second temperature range T2 shown by the arrows 316 represents the desired range of temperatures when a person is not located within the region.

In System 1 with switch 310 opened, the output of divider 246 applied on connector 250 to the decimal decoder 248 will immediately begin indexing a high output in sequence on outputs from Q0 to Q9 as should be well known in the art. A high output on Q0 or Q1 of decimal decoder 248 will apply a high input to OR gate 262. A high output of OR gate 262 will be applied on connector 266 to eliminate current flow through coil 268 to open switch 236. Accordingly, relay 216 will be prevented from activating compressor 218. As the high output is sequenced to output Q2 of the decimal decoder 248, a high output is provided to the set input 300 of set-reset flip flop 298 thus providing a high on output 302 connected to the input of OR gate 274. Each of the differential amplifier circuits 271 or 272 will provide a high output if the temperature sensed by thermistor 270 is within the respective temperature range. A high output from the first amplifier circuit 271 indicates that the temperature in the region is within the first desired temperature range T1 and is applied to OR gate 274. The high output of OR gate 274 is applied to the AND gate 276. If the first amplifier circuit 271 produces a high output indicating that the temperature within the region is within the first desired temperature range T1, then the second amplifier circuit 272 will likewise produce a high output since the range of temperature for the second amplifier circuit is wider than the temperature range for the first amplifier circuit. The high output of the second amplifier circuit 272 will be applied to AND gate 276 thereby providing a high output from AND gate 276 which is applied to OR gate 262. The high output of OR gate 262 will block current flow through coil 268 thus opening switch 236.

If the first amplifier circuit 271 indicates that the temperature within the region is outside of the first temperature range T1, but within the second temperature range, T2 then the first amplifier circuit 271 will provide a low input to OR gate 274 which is combined with the high input to OR gate 274 from output 302 of flip flop 298. The second amplifier circuit 272 will likewise produce a high output to AND gate 276. The high output of AND gate 276 is applied through OR gate 262 to block current flow through coil 268. If the temperature within the region is outside of the first temperature range T1 but within the second temperature range T2 as hereby stated, and an acoustical disturbance is detected by acoustical transducer 286, then a high output will be passed through connector 290 to OR gate 292 to the reset input 296 of flip flop 298. This provides a low on output 302 to provide a low to the input of OR gate 274. The first amplifier circuit 274 produces a low output to OR gate 274. The low input on AND gate 276 from OR gate 274 coupled with a high input from second amplifier circuit 272 provides a low input to OR gate 262 to enable current flow through the coil 268 thus energizing the compressor 218. When a high output is again provided at Q0 or Q1 of decimal decoder 248, the high input is connected to OR gate 262 to clock current flow through the coil 268 to prevent operation of compressor 218. If the temperature within the region is outside of the first temperature range T1 but within the second temperature range T2 and no acoustical disturbance is detected by transducer 286, then the compressor remains off.

If the temperature within the region is outside of the second temperature range, T1 a low output will be applied from the second amplifier circuit 272 to AND gate 276. A low output is likewise applied from the first amplifier circuit 271 to OR gate 274. Accordingly, a low output of AND gate 276 will be provided to OR gate 262 irrespective of the output 302 of flip flop 298.

The optional line 295 insures that the compressor 218 will run 20% of the time irrespective of occupancy if the temperature in the region is outside the first temperature range T1 but within the second temperature range T2. The optional line 295 may be desirable in some applications.

The circuit operates in a similar fashion when switch 310 is closed except that the high output generated at Q2 is applied to the clock inhibit input 312 of decimal decoder 248. Accordingly, the clock is inhibited from operation until the temperature is changed to be within the desired temperature whereat switch 236 will open. The opening of switch 236 will cause the anti-short cycle circuit 260 to provide a pulse to OR gate 256 to reset the decimal decoder 248. Similarly, if a low voltage is detected by the low voltage detector 252, a high output will be provided to OR gate 256 so long as the low voltage condition persists. Accordingly, the circuit will be inhibited from restarting for a period of time by by Q0 and Q1 after the proper line voltage has been restored to the circuit.

FIG. 6 illustrates the Table for the circuits shown in FIG. 5 with the switch 310 open and closed. When the thermistor 270 indicates the temperature to be within the first temperature range T1 (70–75 degrees), bith System 1 and System 2 inhibit operation of compressor 218 as a normal thermostat. If the system is unoccupied and within the second temperature range T2, both the first and second systems will inhibit operation of the compressor. Upon the presence sensor indicating that a person is within the region and when the temperature within the region is within the second temperature range T2, the first system will duty cycle the compressor to a maximum of 80% ON and a minimum of 0% ON, depending upon when the occupant enters the room. In contrast, with switch 310 closed, System 2 will cycle the compressor from 0 to 100% ON, depending upon the occupancy. For example, if the room is constantly occupied with the temperature being in the second temperature range T2, then System 1 will cycle the compressor for 80% ON and 20% OFF whereas System 2 will cycle the compressor ON a continuous cycle of 100%. The Table in FIG. 6 also illustrates that the first system will cycle the compressor 80% ON and 20% OFF when the temperature is beyond the second temperature range T2 whereas System 2 will cycle the compressor 100% ON when the temperature in the region is beyond the second desired temperature range T2.

FIG. 7 illustrates the circuitry for the controller shown in FIG. 5 with only the additional details of the circuit in FIG. 7 being explained herein. The reduced voltage at terminals 320 from transformer 220 is applied through a current limiting resistor 322 with a varistor 324 disposed across the line to eliminate surges within the line voltage. The power supply comprises a diode 326 and capacitors 328 and 330 in conjunction with a voltage regulator 332. The rectified voltage on connector 334 is applied through a voltage divider network comprising resistors 336 and 338. Capacitor 340 stores a charge in relation to the line voltage powering the control system. If the voltage on capacitor 328 falls below a preselected level, then Zener diode 342 will turn off transistor 344 thus providing a high output through diode 346 to reset input 259 of the decimal decoder 248. The 60 cycle sine wave is applied by conductor 242 through a current limiting resistor 348 to diodes 350 and 352 which clamp the voltage to either side of the power supply. The pulsed direct current voltage signal is passed by a transistor 354 to the divider 246, the output of which is connected to the decoder 248.

The presence sensor 210A comprises an acoustical sensor shown as a crystal microphone, but it should be understood by those skilled in the art that other types of presence sensors may be incorporated with the instant circuit including infrared, motion and ultrasonic detectors. The sensor 286 is connected to a first amplifier 288A preferably having a gain of approximately 10 followed by a second amplifier 288B preferably having a gain of 20. Plural capacitor filters 370 and 372 are disposed between amplifiers 288A and 288B with resistor 289 for filtering the acoustical noise as heretofore described. A second filter comprising capacitors 374 and 376 and resistor 377 is disposed between the second amplifier 288B and a third amplifier 288C having a gain of fifty. The three amplifiers give approximately the same gain as set forth with reference to FIG. 3, but provide a superior signal-to-noise ratio for the operation of the presence sensor 210A. The output of the third amplifier 288C is passed by capacitors 378, diode 380 and capacitor 382 to a set-reset flip flop 384. The output of the set-reset flip flop is applied by line 386 to an input of NAND gate 388 and is simultaneously applied through an inverter 390 to a NAND gate 392.

The thermistor 270 forms a voltage divider network with a resistor 394 such that the voltage between thermistor 270 and resistor 394 varies as a function of temperature within the region to be air conditioned or heated. Resistors 396, 398 and 400 provide a voltage reference source for the noninverting input of amplifier 271A and the inverting input of amplifier 271B. The mid-point 402 between the thermistor 270 and resistor 294 is connected to the remaining inputs of amplifiers 271A and 271B through a resistor 403. Feedback is provided by a resistor 404 which provides a hysteresis to prevent instability in the system during very slow temperature changes in the system. The first circuit comprising the amplifiers 271A and 271B are typically known as a "window comparator" circuit which should be well known to those skilled in the art. The output of the first circuit 271 is provided on connector 406 which output is high only when the temperature sensed by thermistor 270 is within the temperature range established by the resistors 396, 398 and 400.

The second amplifier circuit is substantially identical to the previous circuit having resistors 408, 410 and 412 providing reference voltages for amplifiers 272A and 272B. Feedback is provided by resistor 414 with an output being applied on line 416. The second amplifier circuit 272 is also well known as a "window" comparator and preferably has a range in temperature which is greater than the range in temperature established by the first circuit 271. These ranges are shown as an example in FIG. 6 by arrows 314 and 316.

The output of the first circuit on connector 406 is applied through an inverter 418 to NAND gate 392. The output of the second circuit on line 416 is applied through an inverter 420 to NAND gate 388. NAND gates 388 and 392 are respectively connected to NOR gates 420 and 422 with each of the NOR gates receiving an additional input from Q0 and Q1 of decoder 248 as shown in the drawings. The outputs of NOR gates 420 and 422 are applied to an additional NOR gate 424 powering a transistor 426. A high output produced by NOR gate 424 energizes transistor 426 to terminate conduction in transistor 428 to terminate conduction in coil 268. In addition, the output of NOR gate 424 is applied through a one-shot multivibrator comprising diode 430 and capacitor 432 and resistor 434 to the reset input 259 of decade counter 248. The logical sequence of the operation of the circuit in FIG. 7 should be apparent to those skilled in the art in view of the explanation given in reference to FIG. 5.

Figure 9:
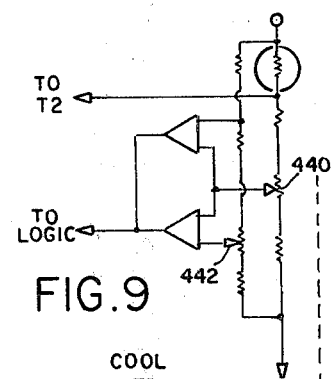
FIG. 9 is an option to the circuit shown in FIG. 7 for providing an adjustable thermostat.
Figure 10:
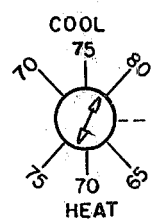
FIG. 10 is a plan view of the control of the optional adjustable thermostat shown in FIG. 9.

FIG. 9 illustrates a variation of a portion of the circuit shown in FIG. 7 wherein potentiometers 440 and 442 replace the fixed reference resistors as shown in FIG. 7 of the first circuit. Potentiometer 440 controls the position of the first temperature range whereas the second potentiometer 442 varies the width of the first temperature range. Accordingly adjustment of potentiometer 440 will change the temperature range to be between 70 and 80 degrees for example, whereas potentiometer 442 will change the width of the first temperature range from 5 degrees to 8 degrees, for example. It should be appreciated by those skilled in the art that similar potentiometers may be incorporated into the second circuit 272. In some instances, it is desirable to place a thermostat control device as shown in FIG. 10 to adjust the location of the first temperature range, namely potentiometer 440, as shown in FIG. 10. This control may be found adjacent to switch 445 shown in FIG. 5 which controls that heat or cooling operation of the system and may optionally be located adjacent the energy saving switch 310 as shown in FIG. 5. These controls may be optionally included within the unit or be accessible to the occupant of the room, depending upon the particular installation.

Figure 8:
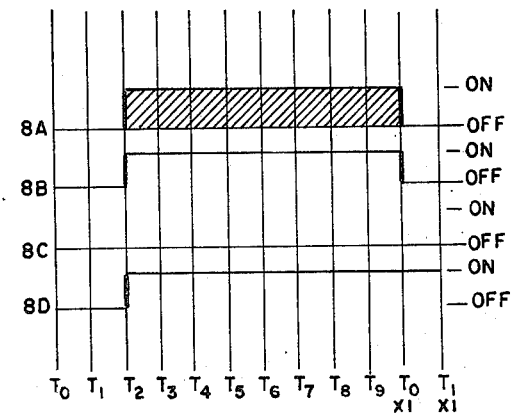
FIGS. 8A-8D illustrate various waveforms and duty cycles present in the controller in FIGS. 5 and 7.

FIG. 8 illustrates some of the various waveforms present in the circuit for various operational conditions. The diagram shows the operation of the compressor 218 as a function of time corresponding to the inputs of decoder 248. In FIG. 8A it is assumed that the temperature within the region is outside of the first temperature range, but is inside the second temperature range and the presence sensor 210A detects the presence of a person. Switch 310 is also assumed to be open. It should be evident that the compressor runs for approximately 80% of the time due to the presence of the occupant as illustrated by the shading within the time of operation.

FIG. 8B illustrates the operation of the compressor as a function of time assuming that the temperature within the region is beyond outside of the second temperature range. In this embodiment, it is assumed that switch 310 is open whereby the compressor runs 80% of the time irrespective of the occupany until the temperature is brought within the second temperature range.

FIG. 8C illustrates the compressor 218 is inhibited from operation when the temperature within the region is within the first temperature range irrespective of time or occupancy.

FIG. 8D illustrates the operation of the circuit when the temperature is outside of the first temperature range but within the second temperature range concurrent with occupancy within the room whereby after the first initial period of time from $T_0$ to $T_2$ the compressor will run continuously until the temperature is restored to the first temperature range. FIG. 8D illustrates the circuit operation when switch 310 is closed thereby terminating any duty cycle provided in the drawings as shown in FIGS. 8A and 8B. FIG. 8D also illustrates the operation of the compressor when the temperature is beyond the second temperature range and switch 310 is closed.

The foregoing has disclosed a unique temperature control device which is responsive to time, temperature and occupancy in contrast to prior patents, including my own United States patent as heretofore described. The various variations have been included within the disclosure and it should be apparent to those skilled in the art that numerous other variations may be resorted to without departing from the disclosed invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, I claim:

1. A control for heating an air conditioning and/or heating system in a region, comprising in combination:
   first means for establishing electrical signals corresponding to an upper and lower temperature of a first temperature range;
   second means for establishing electrical signals corresponding to an upper and lower temperature of a second temperature range;
   timer means for providing periodic outputs during a given operating cycle;
   third means for providing a presence signal upon detecting a person inhabiting the region;
   means connecting said timer means to said third means for actuating said third means at a selected one of said periodic outputs of a given operating cycle of said timer means;
   said third means providing said presence signal for the remainder of said operating cycle upon detecting a person inhabiting the region; and
   fourth means connected to said first, second and third means for controlling the system in accordance with said first temperature range upon a presence signal from said third means and for controlling the system in accordance with said second temperature range upon a lack of a presence signal from said third means.

2. A control as set forth in claim 1, including voltage sensing means for sensing a reduction below a preselected level of the line voltage powering the system; and means connecting said voltage sensing means for terminating operation of the system for a preselected period of time.

3. A control as set forth in claim 1 including means for preventing operation of the system for a preselected period of time upon termination of operation of the system.

4. A control as set forth in claim 1, wherein said third means includes an acoustic sensor for sensing the acoustic output of movement within the region.

5. A control as set forth in claim 4, including filter means interconnected in said third means for discriminating acoustic output of activity within the region from the acoustic output of activity without the region.

6. A control as set forth in claim 1, wherein said first means inhibits operation of the system when the temperature of the region is within said first temperature range.

7. A control as set forth in claim 1, wherein said second means inhibits operation of the system when the temperature in the region is within said second temperature range concurrent with the lack of a presence signal from said third means indicating the region to be void a person therein.

8. A control as set forth in claim 1, wherein said timer means comprising a divider circuit for counting and dividing the alternating current cycles of the line voltage powering the system; and
   decoder means connected to receive the output of said timer means for providing said periodic outputs in said given operating cycle.

9. A control as set forth in claim 8, wherein said fourth means enables operation of the system in accordance with preselected outputs of said periodic outputs when the temperature in the region is within said second temperature range concurrent with a presence signal from said third means sensing the presence of a person inhabiting the region.

10. A control as set forth in claim 9, wherein said preselected outputs includes a periodic duty cycle.

11. A control as set forth in claim 9, wherein said preselected outputs includes a continuous duty cycle.

12. A control as set forth in claim 9, wherein said fourth means enables operation of the system in accordance with said preselected outputs when the temperature of the region is outside of said second temperature range.

13. A control as set forth in claim 12, wherein said preselected outputs includes a periodic duty cycle.

14. A control as set forth in claim 12, wherein said preselected outputs includes a continuous duty cycle.

15. A control for controlling a heating or cooling system in response to the presence of activity within a region, comprising in combination:
   a temperature sensor circuit for sensing the temperature within the region;
   a first circuit for establishing a first desired range of temperature during activity within the region;
   a second circuit for establishing a second desired range of temperature when the region is void of activity;
   a presence sensor circuit for sensing the presence of activity within the region;
   a timing circuit for providing periodic output;
   a logic circuit connected to said circuits for inhibiting operation of the system when the temperature of the region is within the first desired range of temperatures and for inhibiting operation of the system when the temperature of the region is within the second desired range of temperature concurrent with said presence sensor circuit detecting the absence of activity within the region; and said logic circuit enabling operation of the system in accordance with said periodic output of said timing circuit when the temperature of the region is within said second desired temperature range concurrent with said presence sensor circuit detecting the presence of activity within the region.

16. A control for controlling a heating or cooling system in response to the presence of activity within a region, comprising in combination:

temperature sensor circuit for sensing the temperature within the region;

a first circuit for establishing a first desired range of temperature during activity within the region;

a second circuit for establishing a second desired range of temperature when the region is void of activity;

an acoustic pressure sensor circuit for sensing the presence of activity within the region;

a timing circuit for providing periodic outputs;

a logic circuit connected to said circuits for inhhibiting operation of the system when the temperature of the region is within the first desired range of temperatures and for inhibiting operation of the system when the temperature of the region is within the second desired range of temperatures concurrent with said acoustic presence sensor circuit detecting the absence of activity within the region;

said logic circuit enabling operation of the system in accordance with said periodic output of said timing circuit when the temperature of the region is within said second desired temperature range concurrent with said acoustic presence sensor circuit detecting the presence of activity within the region; and said logic circuit enabling operation of the system when the temperature of the region is outside of said second desired temperature range independent of the output of said acoustic presence sensor circuit.

17. A control for controlling a heating or cooling system in response to the presence of activity within a region, comprising in combination:

temperature sensor circuit for sensing the temperature within the region;

a first circuit for establishing a first desired range of temperature during activity within the region;

a second circuit for establishing a second desired range of temperature when the region is void of activity;

a voltage sensing circuit for sensing the line voltage powering the system;

an acoustic presence sensor circuit for sensing the presence of activity within the region;

a timing circuit for providing periodic outputs;

a logic circuit connected to said circuits for inhibiting operation of the system when the temperature of the region is within the first desired range of temperatures and for inhibiting operation of the system when the temperature of the region is within the second desired range of temperatures concurrent with said acoustic presence sensor circuit detecting the absence of activity within the region;

said logic circuit enabling operation of the system in accordance with said periodic output of said timing circuit when the temperature of the region is within said second desired temperature range concurrent with said acoustic presence sensor circuit detecting the presence of activity within the region;

said logic circuit enabling operation of the system when the temperature of the region is outside of said second desired temperature range independent of the output of said acoustic presence sensor circuit;

said logic circuit terminating operation of the system upon said voltage sensing circuit detecting a reduction of the line voltage below a preselected value independent of the temperature and activity within the region; and said logic circuit preventing operation of the system for a preselected period of time upon termination of operation of the system.

18. A control for controlling a temperature system in response to the presence of activity within a region, comprising in combination:

temperature sensor circuit for sensing the temperature within the region;

a first circulit for establishing a first desired range of temperature during activity within the region;

a second circuit for establishing a second desired range of temperature when the region is void of activity;

timer means for providing periodic outputs during a given operating cycle;

a presence sensor circuit for providing a presence signal upon detecting the presence of activity within a region;

means connecting said timer means to said presence sensor circuit for actuating said presence sensor circuit at a selected one of said periodic outputs of a given operating cycle of said timer means;

said presence sensor circuit providing said presence signal for the remainder of said operating cycle upon detecting a person inhabiting the region;

a logic circuit connected to said circuits for inhibiting operation of the system when the temperature of the region is within the first desired range of temperatures and for inhibiting operation of the system when the temperature of the region is within the second desired range of temperatures concurrent with the lack of a presence signal from said presence sensor circuit; and said logic circuit enabling operation of the system when the temperature of the region is within said second desired temperature range concurrent with a presence signal from said presence sensor circuit.

19. A control for controlling a temperature system in response to the presence of activity within a region, comprising in combination:

temperature sensor circuit for sensing the temperature within the region;

a first circuit for establishing a first desired range of temperature during activity within the region;

a second circuit for establishing a second desired range of temperature when the region is void of activity;

timer means for providing periodic outputs during a given operating cycle;

an acoustic presence sensor circuit for providing a presence signal upon sensing the presence of activity within the region;

means connecting said timer means to said presence sensor circuit for actuating said presence sensor circuit at a selected one of said periodic outputs of a given operating cycle of said timer means;

said presence sensor circuit providing said presence signal for the remainder of said operating cycle upon detecting a person inhabiting the region;

a logic circuit connected to said circuits for inhibiting operation of the system when the temperature of the region is within the first desired range of temperatures and for inhibiting operation of the system when the temperature of the region is within the second desired range of temperatures concurrent with a lack of presence signal from said presence sensor circuit;

said logic circuit enabling operation of the system when the temperature of the region is within said second desired temperature range concurrent with a presence signal from said presence sensor circuit; and said logic circuit enabling operation of the system when the temperature of the region is outside of said second desired temperature range independent of a presence signal from said acoustic presence sensor circuit.

20. A control for controlling a temperature system in response to the presence of activity within a region, comprising in combination:

temperature sensor circuit for sensing the temperature within the region;

a first circuit for establishing a first desired range of temperature when the region is void of activity;

a second circuit for establishing a second desired range of temperature when the region is void of activity;

a voltage sensing circuit for sensing the line voltage powering the system;

timer means for providing periodic outputs during a given operating cycle;

an acoustic presence sensor circuit for providing a presence signal upon sensing the presence of activity within the region;

means connecting said timer means to said presence sensor circuit for actuating said presence sensor circuit at a selected one of said periodic outputs of a given operating cycle of said timer means;

said presence sensor circuit providing said presence signal for the remainder of said operating cycle upon detecting a person inhabiting the region;

a logic circuit connected to said circuits for inhibiting operating of the system when the temperature of the region is within the first desired range of temperatures and for inhibiting operation of the system when the temperature of the region is within the second desired range of temperatures concurrent with the lack of a presence signal from said acoustic presence sensor circuit;

said logic circuit enabling operation of the system when the temperature of the region is within said second desired temperature range concurrent with a presence signal from said acoustic presence sensor circuit;

said logic circuit enabling operation of the system when the temperature of the region is outside of said second desired temperature range independent of a presence signal from said acoustic presence sensor circuit;

said logic circuit terminating operation of the system upon said voltage sensing circuit detecting a reduction of the line voltage below a preselected value independent of the temperature and activity within the region; and said logic circuit preventing operation of the system for a preselected period of time upon termination of operation of the system.

* * * * *

UNITED STATES PATENT AND TRADEMARK OFFICE
CERTIFICATE OF CORRECTION

PATENT NO. : 4,433,809
DATED : February 28, 1984
INVENTOR(S) : Schulz, Daniel R.

It is certified that error appears in the above-identified patent and that said Letters Patent are hereby corrected as shown below:

Column 3, line 39, delete "operation".

Column 4, line 8, delete "wil" and insert --will--.

Column 7, line 25, delete "38" and insert --28--.

Column 7, line 58, delete "provided" and insert --produced--.

Column 10, line 66, delete "number".

Column 10, line 68, delete "number".

Column 11, line 21, delete "decomal" and insert --decimal--.

Column 12, line 44, delete "bith" and insert --both--.

Column 14, line 66, delete "beyond".

UNITED STATES PATENT AND TRADEMARK OFFICE
CERTIFICATE OF CORRECTION

PATENT NO. : 4,433,809

DATED : February 28, 1984

INVENTOR(S) : Schulz, Daniel R.

It is certified that error appears in the above—identified patent and that said Letters Patent are hereby corrected as shown below:

Column 18, line 27, delete "circulit" and insert --circuit--.

Signed and Sealed this

Twenty-third Day of July 1985

[SEAL]

Attest:

DONALD J. QUIGG

*Attesting Officer*     *Acting Commissioner of Patents and Trademarks*